Sept. 7, 1926.  
E. CRAIG  
1,599,214  
MACHINE FOR MAKING BOX OR CRATE BLANKS  
Filed August 23, 1920   3 Sheets-Sheet 1

Inventor:  
Edward Craig

Sept. 7, 1926.  
E. CRAIG  
MACHINE FOR MAKING BOX OR CRATE BLANKS  
Filed August 23, 1920   3 Sheets-Sheet 2
1,599,214
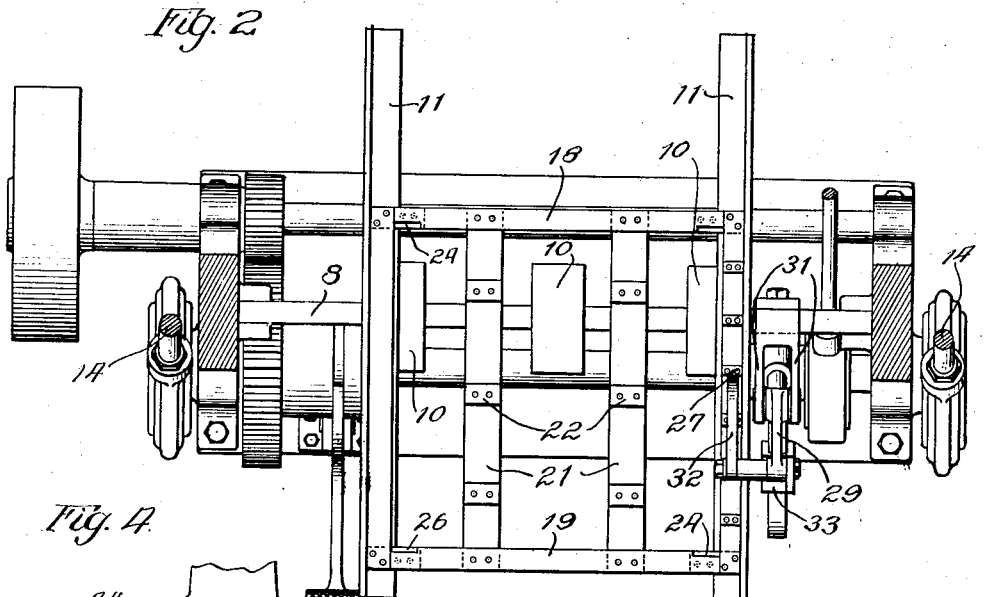
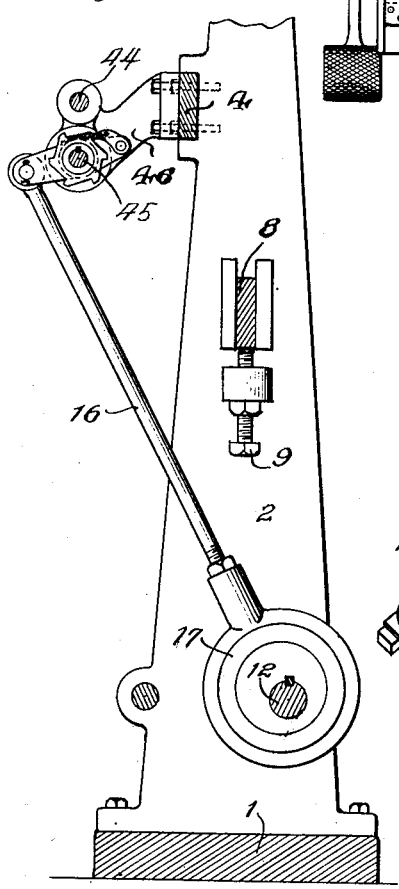
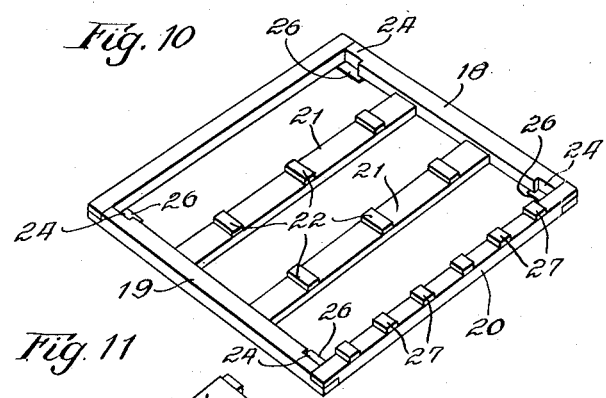
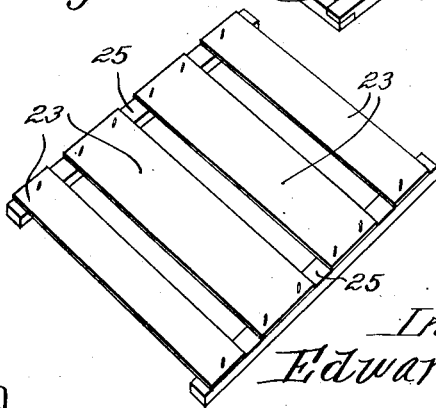
Inventor:  
Edward Craig  
By  
Atty.

Sept. 7, 1926.
E. CRAIG
1,599,214
MACHINE FOR MAKING BOX OR CRATE BLANKS
Filed August 23, 1920     3 Sheets-Sheet 3
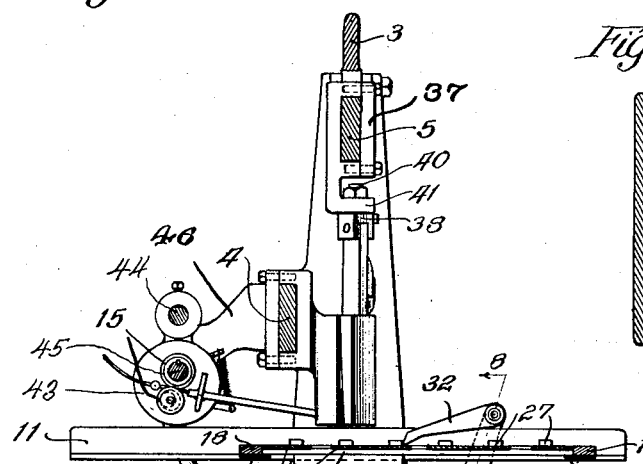
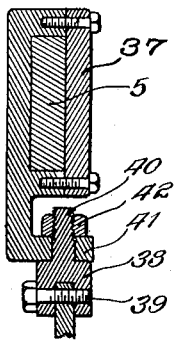
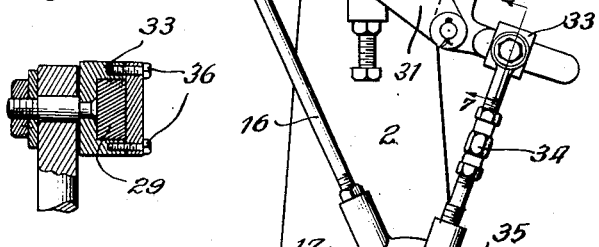
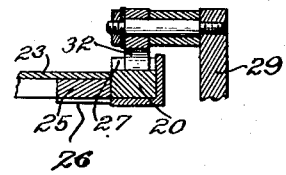
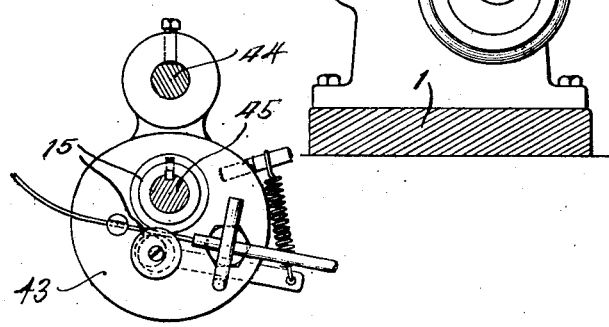
Inventor:
Edward Craig
By Arthur F. Durand
Atty.

Patented Sept. 7, 1926.

1,599,214

UNITED STATES PATENT OFFICE.

EDWARD CRAIG, OF ST. JOSEPH, MICHIGAN.

MACHINE FOR MAKING BOX OR CRATE BLANKS.

Application filed August 23, 1920. Serial No. 405,472.

This invention relates to machines for making blanks for use in the construction of boxes or crates, and more especially to machines of this kind for making crate sides.

Generally stated, the object of the invention is to provide a novel and improved construction whereby the parts of the crate side can be assembled together in a portable work holder, which can then be inserted in the stapling machine, and which is provided with engaging portions along the side thereof to engage a reciprocating element, which element is operated by a suitable power device, whereby the said engaging portions and the said reciprocating element form a ratchet feed connection between the said power device and the said portable work holder, thus insuring the desired intermittent feeding motion for the blank materials below the staplers or other mechanism for performing successive operations on each blank or crate side.

It is also an object to provide certain details and features of construction and combinations tending to increase the general efficiency and the desirability of a crate side machine of this particular character.

To these and other useful ends the invention consists in matters hereinafter set forth and claimed, and shown in the accompanying drawings in which—

Fig. 2 is a horizontal section on line 2—2 in Fig. 1.

Fig. 3 is a vertical section on line 3—3 in Fig. 1.

Fig. 4 is a vertical section on line 4—4 in Fig. 1.

Fig. 6 is an enlarged detail section on line 6—6 in Fig. 1.

Fig. 7 is an enlarged detail section on line 7—7 in Fig. 3.

Fig. 8 is an enlarged detail section on line 8—8 in Fig. 3.

Fig. 9 is an enlarged side elevation of the wire feeding device for feeding the wire from which the staples are made.

Figure 10 is a perspective view of the feed frame.

Figure 11 is a perspective view of a box or crate side which can be produced by the machine disclosed.

Figure 1:
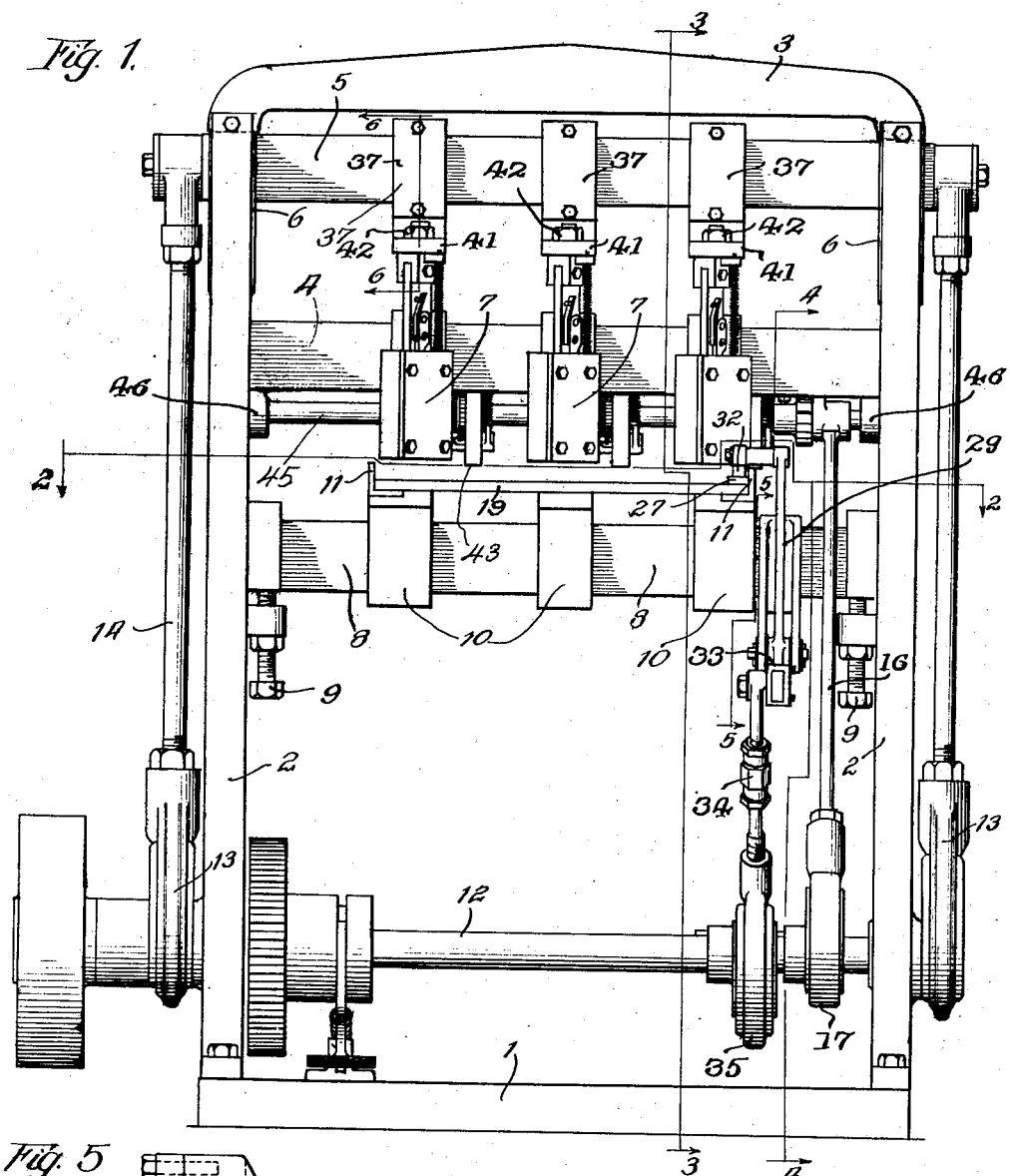
Fig. 1 is a front elevation of a crate side machine embodying the principles of the invention.
Figure 5:
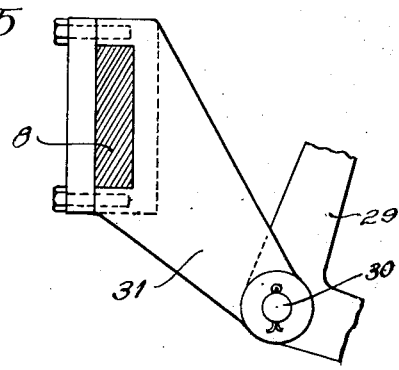
Fig. 5 is an enlarged detail section on line 5—5 in Fig. 1.

As thus illustrated, the invention comprises a base 1 upon which are mounted the side frames 2 of the machine, these side frames being connected together by a transverse upper member 3 of any suitable character. A transverse bar 4 extends between the side frames 2 and an upper transverse bar 5 is mounted to slide up and down in guides 6 formed in said side frames. The staplers 7 are mounted in the usual or any suitable manner on the transverse bar 4, and the bar 5 serves as a cross head to produce the necessary vertical reciprocation of the staple formers and drivers with which such staplers are ordinarily provided. A lower transverse bar 8 is adjustably supported on the frame below the staplers, and is movable up and down by the adjusting screws 9, which latter are suitably supported on the body frame. Brackets 10 having guides 11 are supported on the transverse bar 8 directly below the staplers. A drive shaft 12 is mounted in suitable bearings formed in the body frame, below the bar 8, and is provided with eccentric cam devices 13 which are connected by pitmen 14 with the outer ends of the cross head 5 to actuate the latter up and down. Each stapler has a wire feeding device 15 of any suitable or desired character to feed the wire from which the staples are made. These wire feeding devices are suitably operated through the medium of a pitman 16 which is connected to an eccentric cam 17 on the shaft 12, so that all of the wire feeding devices are operated in unison.

The means for feeding the blanks or crate sides below the staplers are as follows: A rectangular frame is provided comprising a transverse front member 18, a transverse rear member 19, side members 20, and longitudinal members 21, the latter having spacers 22 thereon for spacing apart the transverse slats or strips 23 of the blank or crate side. The transverse front and rear members 18 and 19 have notches 24 adjacent the corners of the frame to receive the ends of the cleats 25 of said blank or crate side. Plates 26 are secured to the under side of the frame to form bottoms for said notches, so that pockets are formed in which are supported the ends of said cleats. Engaging portions 27 are provided along the top of one of the side members 20, the entire frame being constructed from wood or any other suitable material. The machine has a bell crank 29 which is fulcrumed at 30 on a bracket 31 supported from the transverse bar 8, this bell crank being arranged to extend upwardly at one side of the table 10 previously mentioned. A feeding element 32 is pivoted on the upper end of one arm of the bell crank, and arranged in position to engage the portions 27 on the said portable frame or work holder. The lower arm of said bell crank is provided with an adjustable portion 33 which is connected by a pitman 34 with the eccentric cam device 35 on the shaft 12 previously mentioned. By loosening the portion 33, by means of its clamping screws 36, it can be adjusted along the length of the bell crank arm, thus varying the stroke which the eccentric device 35 gives the element 32, and thereby changing the stroke of the feeding movement which is given the portable work holder to cause the blank materials to travel intermittently below the staplers. It will be understood that each time the work holder stops, the staplers then insert the staples by which the slats or strips are secured to the cleats of the blank. As shown, there are only two cleats 25, so that only the two outer staplers are brought into action for this purpose, the middle stapler 7 being thrown out of action in any suitable or desired manner. However, for other kinds of work this middle stapler will be brought into action, and it will be understood that the invention is not limited to any particular number of staplers, as the number may vary according to the requirements of the different kinds of work. However, in any event, the portable frame or work holder shown and described is caused to slide along the machine, between the guides 11, so that the frame cannot shift side-wise in either direction, and the portions 27 and the element 32, which latter is like an ordinary ratchet dog, form the ratchet feed connection between the power driven eccentric cam device 35 and the portable work holder, thereby to provide a ratchet like feeding device for feeding the materials intermittently below the staplers. The cleats rest on the brackets 10, as shown, while the staples are being driven, as the plates 26 are quite thin, as shown, and the staplers press the cleats down upon said brackets. When the portable work holder and the completed blank or crate side are pushed entirely through the machine, they may be allowed to fall from the guides 11, and a portable frame loaded with blank materials can then be inserted in the machine, and in this way the machine is adapted for cooperation with a plurality of these portable frames or work holders, which latter can be loaded on a bench and then inserted successively in the machine, some work holders being loaded while others are going through the machine.

Thus a very simple and yet reliable and accurate feeding arrangement is provided for feeding the materials below the staplers for the manufacture of crate sides of the particular form shown and described, or for the manufacture of box or crate blanks of any suitable or desired character. The feeding means thus provided for feeding the work are operable independently of the staplers, as the power for the feeding means is taken directly from the shaft 12 to the ratchet dog 32, and not through the cross head 5 which operates the stapling mechanism, so that the feeding means can be regulated to produce the desired result. The cross head 5 has a plurality of brackets 37 removably secured thereon. The staplers 7 have their upper ends provided with coupling members 38 secured thereto by transverse pivot bolts 39, and the threaded stems or upper ends 40 of these members are inserted upward through the horizontal portions 41 of said brackets. Nuts 42 are applied to said threaded ends to support the staplers, and thus each stapler is adjustable about a horizontal axis formed by the bolt 39 and about a vertical axis formed by the stem 40. Also, of course, each stapler with this arrangement is easily removed and replaced. The upper end of each stem 40 is close to the overhanging portion of the bracket 37 which is clamped upon the cross head 5, so that the nut cannot come clear off.

Each wire feeding device 15 is on a plate 43, and these plates are supported on the transverse cylindric bar 44 and the rotary shaft 45, the said transverse bar and shaft being disposed in the same transverse vertical plane. The upper roll of said feed device is fixed on the shaft 45, and with this arrangement the wire feeding means are very solidly supported and operate to feed the wire in the desired manner.

Thus the wire fed to each stapler, from the wire feeding device allotted to such stapler, travels in the direction opposite to that of the feeding movement of the work. In other words, the work is fed below the staplers in one direction, and below the wire feeding devices, and the wire is fed to the staplers in the opposite direction. Each wire feeding device is mounted independently of its allotted stapler, so that lateral adjustment of the staplers on the transverse bars 4 and 5 does not necessarily result in lateral adjustment of the wire feeding devices on the cylindrical member 44 and the shaft 45, inasmuch as these wire feeding devices are laterally adjustable independently of each other, and independently of the staplers, while the staplers are laterally adjustable independently of each other and independently of the wire feeding devices. Each wire feeding device has a set screw inserted through the top of the plate 43, as shown in Fig. 9, to engage the slightly flattened upper side of the member 44, which latter is suitably supported at its ends on the body frame of the machine. Thus, while the feed pawl 32 is moving back and forth over the projections 27 on the workholder, and is moving up and down in the vertical plane, the staplers are reciprocating vertically, thereby to drive staples each time the work is stationary, and wire is being fed by the wire feed devices 15 to the staplers, both the wire feed devices and the feed pawl 32 being disposed above the horizontal plane of feeding motion of the work, such as the blank shown in Fig. 11, and above the plane of the workholder in which the work is held and carried forward below the staplers. Moreover, it will be seen that the wire feeding devices 15 and the work feeding devices 32 are disposed at opposite sides of the vertical transverse plane in which are located the elements 5, 8 and 40, whereby the bar or crosshead 5 is in the vertical plane of pressure of the staplers, and whereby the lower bar 8 is also in this plane, so that the action and reaction are resisted by the bars 5 and 8 directly in the line of pressure. This obviously results in a strong and rigid construction, and one in which certain distortion strains, such as might be encountered if the elements 5, 40 and 8 were not in vertical alinement with each other, are avoided or eliminated. The brackets 46 which are rigid with the body frame, support the ends of the member 44 and the shaft 45, very obviously, as shown.

What I claim as my invention is:—

1. In a machine for making box or crate blanks, the combination of independently operated mechanism to perform successive operations on the blank materials, work feeding means arranged to travel under said mechanism to intermittently move the materials forward below said mechanism, stationary means to support feeding means and the materials during the operation of said mechanism thereon, a reciprocating element, portions disposed at intervals along said feeding means in position to be engaged by said element, said element being movable back and forth and up and down over and between said portions in a vertical plane entirely outside of the area of the work, a power operated device to operate said element independently of the operation of said mechanism, said portions and element forming a ratchet feed connection from said device to said work feeding means, and means to regulate said power operated device, whereby the work feeding motion may be regulated independently of said mechanism, said feeding means comprising a frame formed with notches adjacent the corners thereof for the ends of cleats, and having one or more longitudinal members provided with portions to space strips apart on said cleats.

2. In a machine of the class described, in combination with driving means to insert fasteners in the work, a portable workholder comprising a rectangular frame having notches in the front and rear transverse members thereof, near the corners of the frame, to position cleats, with the bottom of the workholder open to permit said cleats to be supported by stationary means during the operation of said driving means, one or more longitudinal members having provisions to space strips apart on said cleats, a series of engaging portions along the top of the side of the frame, and a suitably operated ratchet feed pawl to engage said portions.

3. A structure as specified in claim 2, said frame having plates secured to the under side thereof to form a bottom for each of said notches.

4. In a machine for making box or crate blanks, the combination of mechanism to perform successive operations on the blank materials, work feeding means arranged to travel under said mechanism to intermittently move the materials forward below said mechanism, said feeding means comprising an open frame having provisions for holding longitudinal cleats in place with transverse strips spaced apart thereon to form a blank, stationary means to support said cleats and sheets during the operation of said mechanism thereon, a reciprocating element, portions at intervals along the top of one side of said frame adapted to be engaged by said reciprocating element, and a power device to operate said element, said portions and element forming a ratchet feed connection from said device to said means.

5. In a machine for making box or crate blanks, the combination of mechanism to perform successive operations on the blank materials, work feeding means arranged to travel under said mechanism to intermittently move the materials forward below said mechanism, said feeding means comprising a portable workholder adapted to be loaded with the materials and inserted in the machine, guides on said machine for said workholder serving to prevent lateral displacement thereof while feeding forward, stationary means to support the materials during the operation of said mechanism thereon, a reciprocating element, portions at intervals along one side of said workholder adapted to be engaged by said element, and a power device to operate said element, said portions and element forming a ratchet feed connection from said device to said means.

6. In a machine for making box or crate blanks, the combination of mechanism to perform successive operations on the blank materials, work feeding means disposed in a horizontal plane arranged to travel under said mechanism to intermittently move the materials forward below said mechanism, guides on said machine for said work feeding means serving to prevent lateral displacement of the same during the forward movement thereof, stationary means to support the materials during the operation of said mechanism thereon, a reciprocating element, portions at intervals along said feeding means adapted to be engaged by said element, and a power device to operate said element, said portions and said element forming a ratchet feed connection from said device to said means.

7. In a machine for making box or crate blanks, the combination of mechanism to perform successive operations on the blank materials, work feeding means arranged to travel under said mechanism to intermittently move the materials forward below said mechanism, said feeding means comprising a frame formed with notches adjacent the corners thereof for the ends of the cleats, and having one or more longitudinal members provided with portions to space strips apart on said cleats, stationary means to support the materials during the operation of said mechanism thereon, a reciprocating element, portions at intervals along said frame adapted to be engaged by said element, and a power device to operate said element, said portions and element forming a ratchet feed connection from said device to said means.

EDWARD CRAIG.